United States Patent [19]

Thiery

[11] Patent Number: 5,196,584

[45] Date of Patent: Mar. 23, 1993

[54] PROCESS FOR THE PRODUCTION OF POLYETHERS CONTAINING AMINOPHENOXY GROUPS

[75] Inventor: Urs Thiery, Dormagen, Fed. Rep. of Germany

[73] Assignee: Bayer Aktiengesellschaft, Leverkusen, Fed. Rep. of Germany

[21] Appl. No.: 727,713

[22] Filed: Jul. 10, 1991

[30] Foreign Application Priority Data

Jul. 19, 1990 [DE] Fed. Rep. of Germany ....... 4022931

[51] Int. Cl.$^5$ .......................................... C07C 209/32
[52] U.S. Cl. .................................. 564/418; 564/443; 568/586
[58] Field of Search ................. 564/418, 443; 568/586

[56] References Cited

U.S. PATENT DOCUMENTS 3,713,858  1/1973  Eckert ................................. 106/291
4,847,416  7/1989  Durvasula et al. ................. 564/443
4,960,950 10/1990  Durvasula .......................... 568/587

Primary Examiner—Richard L. Raymond
Attorney, Agent, or Firm—Joseph C. Gil; Godfried R. Akorli

[57] ABSTRACT

Disclosed herein is a process for the production of aminophenoxy-terminated polyethers containing recurring structural units corresponding to the following formula $$-CH_2-CH_2-CH_2-CH_2-O-$$

comprising reacting:
a) a polyether component consisting essentially of a polyether diol containing the afore-stated recurring structural units, with
b) a nitrobenzene containing hydroxyl-reactive substituent.

4 Claims, No Drawings

PROCESS FOR THE PRODUCTION OF POLYETHERS CONTAINING AMINOPHENOXY GROUPS

BACKGROUND OF THE INVENTION

This invention relates to a new process for the production of polyethers terminated by aminophenoxy groups, to the polyethers obtained by this process and to their use as reactants for organic polyisocyanates in the production of plastics containing urea groups by the isocyanate polyaddition process.

Polyethers terminated by aminophenoxy groups are valuable starting materials for the production of plastics by the isocyanate polyaddition process. The production of such compounds is described, for example, in EP-A-0,268,849, EP-A-0,288,825 or EP-A-0,335,274.

Basically, the processes according to these prior publications comprise reacting hydroxyl-terminated polyethers, i.e. the polyether polyols known from polyurethane chemistry, with halogen- or alkoxy-substituted nitrobenzenes in the presence of compounds showing an alkaline reaction, to form the corresponding nitrophenoxy-substituted polyethers and subsequently hydrogenating the nitro group to amino groups.

Applicants' own tests have shown that polyether diols which have been produced by polymerization of tetrahydrofuran (THF) are difficult to react, in accordance with this principle to form the corresponding nitrophenyl-terminated compounds, or they can only be correspondingly reacted using polar aprotic solvents, such as for example dimethyl sulfoxide, N-methyl pyrrolidone or dimethyl formamide. However, it would be desirable if these solvents could be replaced by physiologically safer and less expensive solvents, such as for example toluene or xylene, or better still if inert solvents could be dispensed with altogether.

DESCRIPTION OF THE INVENTION

It has now surprisingly been found that this object can be achieved by using polyethers containing the following recurring structural unit

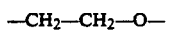

a certain extent in addition to the hydroxyl-terminated polyether component containing recurring structural units corresponding to the following formula

as reactants for nitrobenzenes containing hydroxyl-reactive groups. Hydroxyl-terminated polyethers containing the following recurring structural unit

and, to a certain extent, the following recurring structural unit

in the block can be similarly reacted.

The present invention relates to a process for the production of aminophenoxy-terminated polyethers containing recurring structural units corresponding to the following formula

by reacting:
a) a polyether component consisting essentially of a polyether diol containing recurring structural units corresponding to the formula

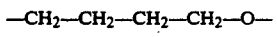

and having a molecular weight in the range from about 400 to 6,000
with
b) a compound corresponding to the following formula

in which
R is hydrogen or a methyl group and
X is fluorine, chlorine, a methoxy group or an ethoxy group, in the presence of a compound showing an alkaline reaction and subsequently hydrogenating the nitro groups present in the intermediate product thus obtained to amino groups, characterized in that component a) contains at least 2% by weight ethylene oxide units incorporated within polyether chains, these ethylene oxide units being part of the polyether diols mentioned and/or having been introduced into component a) by admixture of other polyether polyols containing ethylene oxide units and having a molecular weight in the range from about 200 to 6,000 with these polyether diols, with the proviso that the percentage content of the last mentioned polyether polyols is at most 30% by weight, based on the total weight of component a).

The present invention also relates to the polyethers containing terminally incorporated structural units corresponding to the following formula

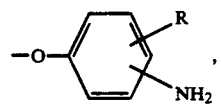

and recurring structural units corresponding to the following formula

obtained by this process.

Finally, the present invention also relates to the use of the products obtained by the process according to the invention as reactants for organic polyisocyanates in the production of plastics containing urea groups by the isocyanate polyaddition process.

Starting materials for the process according to the invention are a) a polyether component and b) optionally methyl-substituted nitrobenzenes containing hydroxyl reactive substituents.

The polyether component a) consists essentially of polyether diols containing structural units corresponding to the following formula

having a molecular weight (calculable from the hydroxyl group content) of about 400 to 6,000 and preferably 700 to 4,000.

The polyether diols in question can be produced in a known manner by polymerization of tetrahydrofuran (THF) on its own in the presence of suitable catalysts, such as trifluoromethane sulfonic acid, trifluoromethane sulfonic anhydride, fluorosulfonic acid or oleum and, optionally, subsequent reaction of the pure polytetramethylene oxide ether with potassium hydroxide (KOH) and the desired quantity of ethylene oxide. THF may also be grafted onto polyethylene glycol using the catalysts mentioned, by way of an example.

In accordance with the invention, it is crucial that the polyether component a) contain at least 2% by weight, preferably 3 to 30% by weight and, more preferably, 5 to 20% by weight, based on the total weight of component a), of ethylene oxide units corresponding to the following formula

within polyether chains. These ethylene oxide units may both be chemically incorporated in the polyether diols mentioned or may even have been introduced into the starting component a) in the form of a second polyether component to be mixed with the polyether diols.

The optional mixing component may comprise any polyether polyols which have a molecular weight—calculable from the hydroxyl group content and the hydroxyl functionality—in the range from about 200 to 6,000, preferably in the range from 400 to 4,000 and more preferably in the range from 400 to 2,000 and a hydroxyl functionality of 2 to 4 and preferably 2. Polyether polyols such as these are obtained in a known manner by alkoxylation of suitable starter molecules, such as for example water, ethylene glycol, propylene glycol, glycerol, trimethylol propane, pentaerythritol or mixtures of such starter molecules, ethylene oxide or even mixtures of ethylene oxide with other alkylene oxides, such as propylene oxide or butylene oxides, or even tetrahydrofuran being used during the alkoxylation reaction. The polyether polyols optionally used as a mixing component have an ethylene oxide content of at least 10% by weight. They are used in quantities of at most 50% by weight and preferably in quantities of at most 30% by weight, based on the total weight of component a)

According to the invention, it is particularly preferred to use a starting component a) which, in accordance with the foregoing observations, comprises either of polyether diols corresponding to the following formula

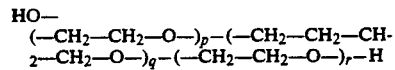

in which
  q is a whole or (on a statistical average) broken number of 6 to 83 and
  p and r may be the same or different and represent whole or (on a statistical average) broken numbers of 0.2 to 40,
or of mixtures of such polyether diols with polyethylene glycols having a molecular weight in the range from about 400 to 2,000.

Starting materials b) suitable for use in accordance with the invention include optionally methyl-substituted halonitrobenzenes, methoxynitrobenzenes or ethoxynitrobenzenes corresponding to the following general formula

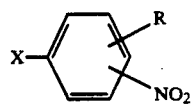

in which
  R is hydrogen or a methyl group, preferably hydrogen,
  X is fluorine, chlorine, methoxy or ethoxy, preferably chlorine or methoxy,
and in which the halogen or alkoxy and nitro substituents are preferably arranged in the ortho position or para position to one another. Suitable nitrobenzenes corresponding to the above formula are, for example, 2-nitrochlorobenzene, 2-nitrofluorobenzene, 4-nitrochlorobenzene, 4-nitro-fluorobenzene, 1-methyl-2-nitro-3-chlorobenzene, 1-methyl-2-nitro-3-fluorobenzene, 1-methyl-4-nitro-5-chlorobenzene, 1-methyl-4-nitro-5-fluorobenzene, 1-methyl-2-nitro-6-chlorobenzene, 1-methyl-2-nitro-6-fluorobenzene, 2-methoxynitrobenzene, 4-methoxynitrobenzene, 2-ethoxynitrobenzene, 4-ethoxynitrobenzene, 1-methoxy-3-methyl-2-nitrobenzene, 1-methoxy-3-methyl-4-nitrobenzene, 1-ethoxy-3-methyl-2-nitrobenzene or 1-ethoxy-3-methyl-4-nitrobenzene. Particularly preferred starting materials (ii) are 2-nitrochlorobenzene, 4-nitrochlorobenzene, 2-nitroanisole or 4-nitroanisole.

Examples of the alkaline compound required for the reaction of the polyhydroxyl compounds (i) with the halonitrobenzenes or alkoxynitrobenzenes (ii) are, for example, metal hydrides, metal alkoxides and, preferably, metal hydroxides. Sodium hydroxide and potassium hydroxide are particularly preferred.

In the first stage of the process according to the invention, the starting materials a) are used in subequivalent quantities, in equivalent quantities or in excess, based on component b). In general, the equivalent ratio of hydroxyl groups of component a) to halogen or alkoxy groups of component b) is from 1:0.1 to 1:3 and preferably from 1:0.3 to 1:1.5.

As already mentioned, the hydrogen halide given off during the reaction can be bound by addition of compounds showing an alkaline reaction. The quantity in which such compounds are used is at least gauged to be sufficient to neutralize the hydrogen halide given off. The compounds showing an alkaline reaction are preferably used in such a quantity that 1 to 3 mol the alkaline compound equivalents are available per mol of component b). Where alkoxynitrobenzenes b) are used small quantities of alkaline compound i.e. 0.1 to 1.0 mol of alkaline compound equivalents per mol of component b), are possibly sufficient.

The first stage of the process according to the invention is carried out in bulk or optionally in an organic solvent. The reactants can be present in a homogeneous phase or in two phases, and in a dissolved, emulsified or suspended form. Suitable organic solvents are for example: benzene, toluene or xylene. It is of course also possible to use any desired mixture of such solvents.

The solvents optionally used is generally employed in a quantity sufficient to produce a clear solution of starting material b). In practice this means that the solvents are generally used in a quantity of from 50 to 1000, preferably 100 to 500 parts by weight, per 100 parts by weight of component b).

The first stage of the process according to the invention is generally carried out continuously or discontinuously at 10 to 100° C., preferably 20° to 80° C., and preferably under atmospheric pressure, but where appropriate also under reduced or excess pressure. This residence time is generally from 0.5 to 36 hours, preferably from 0.5 to 18 hours.

The first stage of the process according to the invention may be carried out, for example, by initially introducing starting component a) and the alkaline compound, removing the water and continuously adding component b), i.e. the nitrophenylating agent, in molten form or optionally in dissolved suspended form with stirring and optionally with cooling. The reaction mixture is then stirred at room temperature or, optionally, at an elevated temperature of, for example, up to 100° C. and preferably up to 80° C. until complete conversion of the nitrophenylating agent b) is indicated by thin-layer chromatography or gas chromatography.

The nitrophenoxy adducts are worked up by methods known, per se. Approximately 5 to 30% by weight water is first added to the reaction mixture; the reaction mixture is then neutralized with an acid, preferably sulfuric acid (H2SO4) or hydrochloric acid (HCl), and water is distilled off again. The salt, precipitating, is filtered off. In general, the crude product thus obtained may be subsequently processed without further purification. In special cases, purification using a thin layer evaporator can be of advantage.

A procedure in which the reaction mixture accumulating in the first stage is delivered directly to the second stage without intermediate isolation, optionally after neutralization of the excess alkaline compound such as, alkali hydroxide, could also be adopted in principle, but would be less preferred.

The nitrophenoxy-terminated compounds obtained in the first stage of the process according to the invention are converted into the corresponding polyamines in the second stage in known manner by reduction with nascent hydrogen or catalytic hydrogen, for example hydrogen activated with Raney nickel or palladium on carbon. The hydrogenation reaction may take place in the presence or absence of inert solvents at 20° to 120° C. under a pressure of 20 to 80 bar. Suitable solvents are, for example, methanol, ethanol, i-propanol or toluene. Methanol, isopropanol and toluene are preferred. The amines are obtained as distillation residue in the removal of the solvent by distillation and may be used in accordance with the invention, optionally without further purification steps.

The polyamines according to the invention obtained after working up are generally light to dark-brown colored products. In accordance with the foregoing observations, the products obtained by the process according to the invention are polyethers or polyether mixtures containing terminally arranged structural units corresponding to the following formula

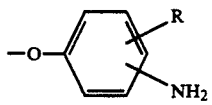

in which

R is hydrogen or a methyl group and the amino group and the oxygen atom are preferably arranged in the ortho position or para position to one another.

In accordance with the foregoing observations in regard to the equivalent ratio between obtained by the process according to the invention may also contain free hydroxyl groups in addition to the aminophenoxy groups, 10 to 100% and preferably 30 to 95% of the isocyanate-reactive groups in the end products obtained by the process according to the invention, comprising amino groups introduced in accordance with the invention, and the rest being hydroxyl groups. The average functionality of the products obtained by the process according to the invention in the context of the isocyanate polyaddition reaction is generally from 2 to 3 and preferably 2, taking into account the possible use of polyether polyols of relatively high functionality containing ethylene oxide units.

The products obtained by the process according to the invention are suitable as reactants for optionally blocked polyisocyanates in the production of plastics containing urea groups, e.g., cellular polyureas optionally containing urethane groups. The end products of the process according to the invention may also be combined with other low molecular weight or relatively high molecular weight compounds containing isocyanate-reactive groups. Suitable starting components such as these are mentioned, for example, in DE-A-2,302,564, DE-A-2,432,764 (U.S. Pat. No. 3,903,679) and in DE-A-2,639,083, 2,512,385, 2,513,815, 2,550,796, 2,550,797, 2,550,833, 2,550,860 and 2,550,863. References to auxiliaries and additives which may optionally be used in the production of polyurethanes can also be found in these publications.

The polyamines according to the invention are particularly suitable for use in combination with solid polyisocyanates. According to DE-A 3,320,757, reaction systems storable indefinitely at room temperature or even at elevated temperature can be produced with these components which are curable at relatively high temperatures. Systems such as these are generally referred to as one-component systems. Suitable solid polyisocyanates are, for example, dimeric 2,4-diisocyanatotoluene (TT) or 3,3'-dimethyl-4,4'-diisocyanatodiphenyl urea (TDIH).

The plastics containing urea groups produced using the products obtained by the process in accordance with the invention are suitable for any applications hitherto known for polyurethane plastics.

In the following Examples, all percentages are by weight, unless otherwise stated.

EXAMPLE 1 a) Nitrophenylation 100 g (0.07 mol) of a polyethylene oxide ether diol, OH value 80, were added to 900 g of a poly-THF-ether diol, OH value 56, and the resulting mixture was melted at 65° C. 174.7 g (1.56 mol) 50% potassium hydroxide were added to the resulting melt which was then degassed for 15 minutes at 50° C./1 mbar, 74 g H2O then being distilled off at 120° C./1 mbar.

The mixture was cooled to 37° C. and 115 g (0.73 mol) 4-chloronitrobenzene dissolved in 200 ml toluene were then added over a period of 45 minutes so that the temperature of the mixture did not exceed 40° C.

The mixture was stirred for 4 h at 40° C./5 mbar until no more p-chloronitrobenzene could be detected by thin layer chromatography.

5 g water were added to the mixture which was then neutralized with 60 ml concentrated hydrochloric acid. The water was distilled off at 110° C./1 mbar and the salt was filtered off through a pressure nutsche at 80° C./2 bar. OH value: 14. Viscosity: solid at room temperature (yellow wax).

b) Hydrogenation 526 g of the nitrophenylated polyether according to Example 1a) were dissolved in 526 ml methanol and 21 g Raney nickel were added to the resulting solution. The resulting mixture was introduced into a pressure vessel and hydrogenated under a hydrogen pressure of 60 bar at the beginning of the reaction and at a temperature of 70° C., filtered off from the catalyst and the solvent removed by distillation. Dark brown product. Viscosity: 900 mPa.s/50° C. NH value: 37.

COMPARISON EXAMPLE 1000 g (0.5 mol) poly-THF-ether diol, OH value 56, were reacted with 110.3 g (0.7 mol) 4-chloronitrobenzene and 168 g (1.5 mol) 50% potassium hydroxide as in Example Ia, but without the polyethylene oxide ether diol, and the reaction product was similarly worked up.

The reaction was terminated after stirring for 4 hours at 40° C./1 mbar and the content of 4-chloronitrobenzene was determined (3.5% by weight). In addition, more than 3% by weight secondary products are present in the product. OH value: 49. viscosity: solid at room temperature (dark brown wax).

EXAMPLES 2 TO 12

Examples 2 to 12 were carried out in the same way as Example 1, except that the starting materials and the reaction conditions were varied. The reaction conditions and the results obtained are shown in the following Table, the data of Example 1 being shown once again in the interests of clarity.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aminophenoxy-terminated polyether containing recurring structural units corresponding to the following formula

—CH$_2$—CH$_2$—CH$_2$—CH$_2$—O— comprising reacting:
a) a polyether component consisting essentially of a polyether diol containing recurring structural units corresponding to the formula

—CH$_2$—CH$_2$—CH$_2$—CH$_2$—O— and having a molecular weight in the range from 400 to 6,000
with
b) a compound corresponding to the following formula

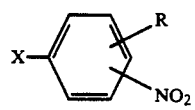

in which
R is hydrogen or a methyl group and
X is fluorine, chlorine, a methoxy group or an ethoxy group, in the presence of compounds showing an alkaline reaction, and subsequently hydrogenating the nitro groups present in the intermediate products thus obtained to amino groups, characterized in that component a) contains at least 2% by weight ethylene oxide units incorporated within polyether chains, these ethylene oxide units being part of the polyether diols mentioned and/or having been introduced into component a) by admixture of other polyether polyols containing ethylene oxide

TABLE

| Nitro p. Example | PW % | NPhR | Equiv. | KOH equiv. | React. time | OH value | Amino p. Example | NH value | OH value | Visc. mPas/50° C. |
|---|---|---|---|---|---|---|---|---|---|---|
| 1 a) | 10 | p-NCB | 0.70 | 1.5 | 4 h | 14 | 1 b) | 37 | 51 | 900 |
| 2 a) | 5 | p-NCB | 0.95 | 1.5 | 24 h | 6 | 2 b) | 46 | 52 | 800 |
| 3 a) | 10 | p-NCB | 0.95 | 1.5 | 24 h | 3 | 3 b) | 43 | 51 | 1,300 |
| 4 a) | 10 | p-NCB | 0.70 | 1.5 | 4 h | 14 | 4 b) | 37 | 48 | 910 |
| 5 a) | 3 | p-NCB | 0.70 | 1.5 | 13 h | 13 | 5 b) | 36 | 51 | 1,230 |
| 6 a) | 10 | p-NCB | 1.20 | 1.5 | 7 h | 0 | 6 b) | 46 | 50 | 1,050 |
| 7 a) | 5 | o-NCB | 0.70 | 1.2 | 21 h | 10 | 7 b) | 36 | 49 | 830 |
| 8 a) | 10 | o-NCB | 0.95 | 1.5 | 5 h 30' | 6 | 8 b) | 41 | 51 | 1,160 |
| 9 a) | 10 | p-NA | 0.70 | 0.5 | 3 h | 11 | 9 b) | 37 | 49 | 1,350 |
| 10 a) | 10 | p-NA | 0.95 | 0.5 | 6 h | 4 | 10 b) | 42 | 48 | 910 |
| 11 a) | 10 | o-NA | 0.95 | 0.5 | 6 h | 12 | 11 b) | 41 | 49 | 1,350 |
| 12 a) | 10 | p-NPE | 0.70 | 0.5 | 18 h | 16 | 12 b) | 34 | 50 | 1,500 |

Nitro p.: nitrophenyl-terminated polytetramethylene oxide ether
Amino p.: aminophenyl-terminated polytetramethylene oxide ether
NPhR: nitrophenylating agent
p-NCB: p-chloronitrobenzene
p-NA: p-nitroanisole
p-NPE: p-nitrophenetol
Reaction conditions: stirring at 40° C./5 mbar
Example 2 a)/b)–12 a)/b) carried out in the same way as Example 1 a)/b)
PW: Polywax (polyethylene oxide etherdiol, OH value - 80)
% = % by weight of the polyether mixture
Equiv.: mol equivalent, based on mol OH groups of the polyether mixture
OH value: OH value determined by peracetylation with acetic anhydride
NH value: NH value determined by titration with perchloric acid units and having a molecular weight in the range from 200 to 6,000 with these polyether diols, with the proviso that the percentage content of the last mentioned polyether polyols is at most 30% by weight, based on the total weight of component a).

2. A process as claimed in claim 1, characterized in that component a) contains 5 to 20% by weight ethylene oxide units incorporated within the polyether.

3. A process as claimed in claim 1 characterized in that the ethylene oxide unit is introduced into component a) by using a polyethylene glycol having a molecular weight in the range from 400 to 2,000.

4. A process as claimed in claim 2 characterized in that the ethylene oxide unit is introduced into component a) by using a polyethylene glycol having a molecular weight in the range from 400 to 2,000.

* * * * *